(12) United States Patent
Takase et al.

(10) Patent No.: US 7,651,397 B2
(45) Date of Patent: Jan. 26, 2010

(54) GAME DEVICE, PROGRAM, INFORMATION STORAGE MEDIUM, GAME DEVICE CONTROL METHOD, GAME DISTRIBUTION METHOD, AND GAME DISTRIBUTION DEVICE

(75) Inventors: Yasumi Takase, Tokyo (JP); Yumi Yoshida, Tokyo (JP); Naohiro Yamamoto, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 631 days.

(21) Appl. No.: 10/504,821

(22) PCT Filed: Feb. 27, 2003

(86) PCT No.: PCT/JP03/02249

§ 371 (c)(1),
(2), (4) Date: Aug. 17, 2004

(87) PCT Pub. No.: WO03/072214

PCT Pub. Date: Sep. 4, 2003

(65) Prior Publication Data

US 2005/0090309 A1    Apr. 28, 2005

(30) Foreign Application Priority Data

Feb. 28, 2002    (JP) .............................. 2002-054805

(51) Int. Cl.
*G06F 9/312*    (2006.01)
(52) U.S. Cl. ...................................................... 463/43
(58) Field of Classification Search .................. 463/43, 463/45, 1, 31
See application file for complete search history.

(56) References Cited

U.S. PATENT DOCUMENTS 6,045,447 A * 4/2000 Yoshizawa et al. ............ 463/31

(Continued)

FOREIGN PATENT DOCUMENTS

EP    0 933 724 A1    8/1999

(Continued)

OTHER PUBLICATIONS

Scott Bilas: "It's still loading?" Game Developers Conference 2000 Proceedings, 'Online! Mar. 12, 2000, XP002367228 Retrieved from the Internet:URL: http://www.gamasutra.com/features/gdcarchive/2000/bilas.doc.

*Primary Examiner*—Peter DungBa Vo
*Assistant Examiner*—Masud Ahmed
(74) *Attorney, Agent, or Firm*—Sughrue Mion, PLLC

(57) ABSTRACT

To provide a game device capable of selecting game data to be played by a player when playing a game in a straightforward manner. One or a plurality of primary play candidate data names are selected from secondary play candidate data containing one or a plurality of items of game data and names for this game data. A primary play candidate data file configured so as to contain primary play candidate data name information necessary for displaying the selected primary play candidate name(s) is stored in a storage media. One or a plurality of primary play candidate data names is then displayed based on the stored primary play candidate data name information. One or a plurality of the displayed primary play candidate data names is selected as one or a plurality of play target data names. A game can then be controlled based on game data for the selected play target data name(s).

12 Claims, 9 Drawing Sheets

U.S. PATENT DOCUMENTS

| | | | |
|---|---|---|---|
| 6,338,680 B1 * | 1/2002 | Connors | 463/43 |
| 6,477,543 B1 | 11/2002 | Huang et al. | |
| 6,716,102 B2 * | 4/2004 | Whitten et al. | 463/43 |
| 6,789,263 B1 | 9/2004 | Shimada et al. | |
| 6,807,521 B1 * | 10/2004 | Kurosawa et al. | 703/22 |
| 6,820,265 B1 * | 11/2004 | Stamper et al. | 719/312 |
| 2001/0034267 A1 * | 10/2001 | Toyama et al. | 463/31 |
| 2003/0069071 A1 * | 4/2003 | Britt et al. | 463/42 |

FOREIGN PATENT DOCUMENTS

| | | |
|---|---|---|
| EP | 0 998 966 A2 | 5/2000 |
| EP | 1 179 944 A2 | 2/2002 |
| JP | 5-12342 A | 1/1993 |
| JP | 9-244925 A | 9/1997 |
| JP | 2000-244903 A | 9/2000 |
| TW | 362320 | 6/1999 |
| TW | 474077 | 1/2002 |

\* cited by examiner

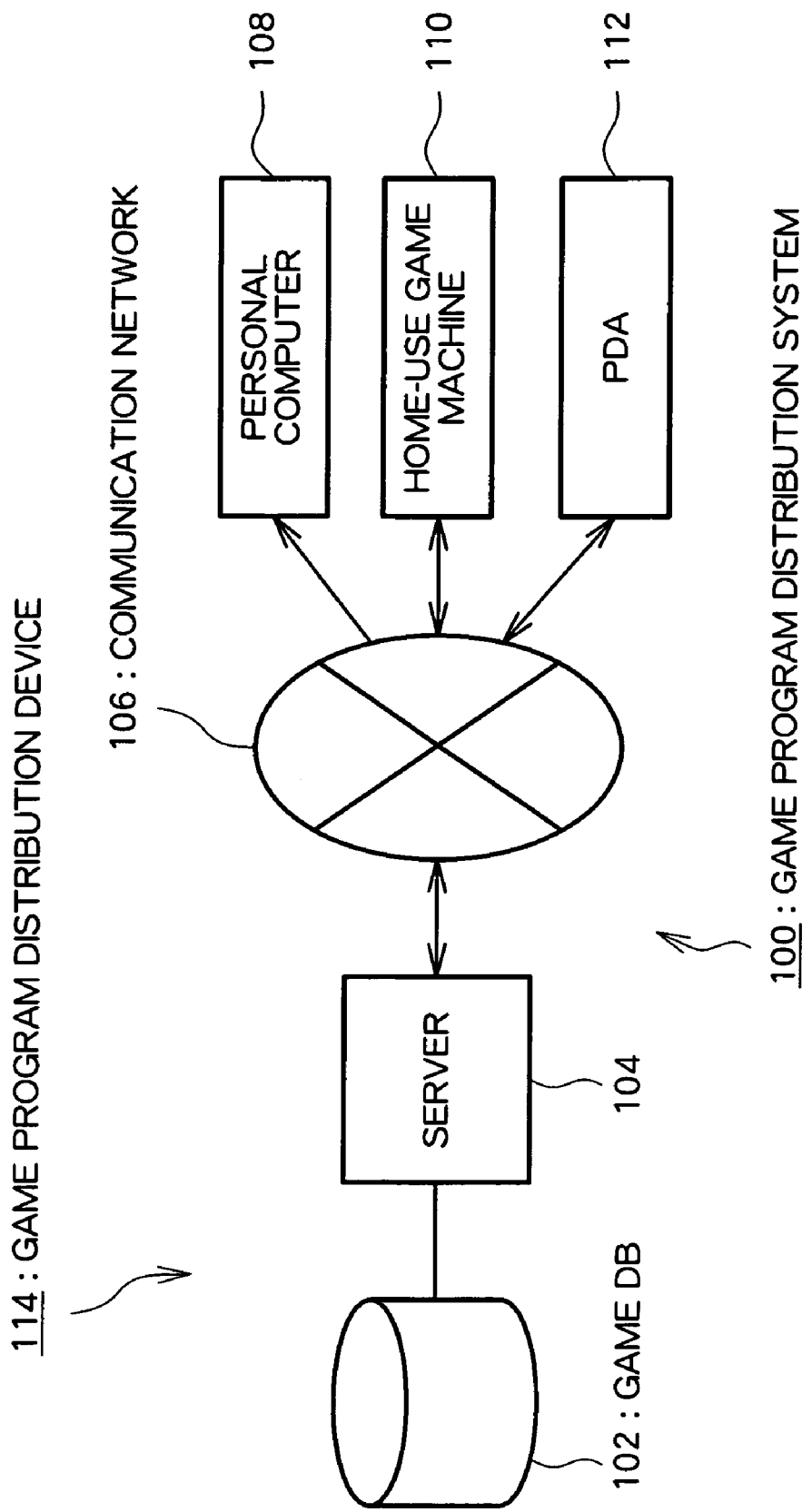

GAME DEVICE, PROGRAM, INFORMATION STORAGE MEDIUM, GAME DEVICE CONTROL METHOD, GAME DISTRIBUTION METHOD, AND GAME DISTRIBUTION DEVICE

TECHNICAL FIELD

The present invention relates to a game device, program, information storage media, game device control method, game distribution method and game distribution device, and particularly relates to technology capable of enabling a player to easily select game data to be played when playing a game.

BACKGROUND ART

It is possible to increase the level of interest in a game by enabling a player to make their own data (game data) to be used in a game or to obtain game data from another disc or via a network. For example, it is well known that a player can make their own step data in dance games where a player acts out steps according to step instructions displayed on a screen based on step data. In this kind of game, it is typical for game data made by a player to be capable of being stored on a non-volatile storage device such as a memory card or hard disc storage device etc. It is therefore possible from the next time the player plays the game onwards for the player to play the game based on game data that they themselves have made by selecting game data for the game to be played from game data stored in the non-volatile storage device.

However, it is the nature of this kind of game data that players tend to collect such game data, and situations where players do not erase the game data they have made themselves but simply keep the data are common. There are therefore cases where the number of items of game data is increased while game data having a large volume is displayed on a game data selection screen. Such cases cause the possibility to arise that it may be impossible to select the game data that the player wishes to play the game with in a straightforward manner. In particular, if game data for which the likelihood of selection is high, i.e. game data which is played frequently, cannot be selected in a straightforward manner, this is stressful for the player.

The present invention has been conceived in view of the above, and aims to provide a game device, program, information storage media, game device control method, game distribution method and game distribution device capable of enabling a player to select game data to be played in a straightforward manner while playing a game.

DISCLOSURE OF THE INVENTION

In order to resolve the aforementioned problems, a game device of the present invention comprises secondary play candidate data storage means for storing secondary play candidate data containing one or a plurality of game data used in playing a game and a name for the game data, primary play candidate data name selection means for selecting one or a plurality of game data names from secondary play candidate data stored in the secondary play candidate data storage means as one or a plurality of primary play candidate names, primary play candidate data storage means for storing primary play candidate data including primary play candidate data name information for displaying said one or a plurality of primary play candidate data names selected by the primary play candidate data name selection means, primary play candidate data name display means for displaying said one or a plurality of primary play candidate data names selected by the primary play candidate data name selection means based on primary play candidate data name information, play target data name selection means for selecting one or a plurality of game data names from primary play candidate data names displayed by the primary play candidate data name display means as one or a plurality of play target data names, play target data acquisition means for acquiring game data relating to said one or a plurality of play target data names selected by the play target data name selection means as play target data, and game control means for controlling a game based on game data acquired by the play target data acquisition means.

Further, a program of the present invention is a program for having a computer such as a home-use game machine, a business use game machine, a portable game machine, a portable telephone or a personal computer to function as secondary play candidate data storage means for storing secondary play candidate data containing one or a plurality of game data used in playing a game and a name for the game data, primary play candidate data name selection means for selecting one or a plurality of game data names from secondary play candidate data stored in the secondary play candidate data storage means as one or a plurality of primary play candidate names, primary play candidate data storage means for storing primary play candidate data including primary play candidate data name information for displaying said one or a plurality of primary play candidate data names selected by the primary play candidate data name selection means, primary play candidate data name display means for displaying said one or a plurality of primary play candidate data names selected by the primary play candidate data name selection means based on primary play candidate data name information, play target data name selection means for selecting one or a plurality of game data names from primary play candidate data names displayed by the primary play candidate data name display means as one or a plurality of play target data names, play target data acquisition means for acquiring game data relating to said one or a plurality of play target data names selected by the play target data name selection means as play target data, and game control means for controlling a game based on game data acquired by the play target data acquisition means.

Further, an information storage media of the present invention is an information storage media for storing a program for having a computer such as a home-use game machine, a business use game machine, a portable game machine, a portable telephone or a personal computer to function as secondary play candidate data storage means for storing secondary play candidate data containing one or a plurality of game data used in playing a game and a name for the game data, primary play candidate data name selection means for selecting one or a plurality of game data names from secondary play candidate data stored in the secondary play candidate data storage means as one or a plurality of primary play candidate names, primary play candidate data storage means for storing primary play candidate data including primary play candidate data name information for displaying said one or a plurality of primary play candidate data names selected by the primary play candidate data name selection means, primary play candidate data name display means for displaying said one or a plurality of primary play candidate data names selected by the primary play candidate data name selection means based on primary play candidate data name information, play target data name selection means for selecting one or a plurality of game data names from primary play candidate data names displayed by the primary play candidate data name display means as one or a plurality of play target data names, play target data acquisition means for acquiring game data relating to said one or a plurality of play target data names selected by the play target data name selection means as play target data, and game control means for controlling a game based on game data acquired by the play target data acquisition means.

Further, a control method for a game device of the present invention comprises a secondary play candidate storage step of storing secondary play candidate data containing one or a plurality of game data used in playing a game and a name for the game data in a non-volatile storage device, a primary play candidate data name selection step of accepting selection of one or a plurality of game data names from secondary play candidate data stored in the non-volatile storage device as one or a plurality of primary play candidate names, a primary play candidate data storage step of storing primary play candidate data including primary play candidate data name information for displaying said one or a plurality of primary play candidate data names selected in the primary play candidate data name selection step in the non-volatile storage device, a primary play candidate data name display step for displaying said one or a plurality of primary play candidate data names selected in the primary play candidate data name selection step based on primary play candidate data name information, a play target data name selection step for accepting selection of one or a plurality of game data names from primary play candidate data names displayed in the primary play candidate data name display step as one or a plurality of play target data names, a play target data acquisition step for acquiring game data relating to said one or a plurality of play target data names selected in the play target data name selection step as play target data, and a game control step for controlling a game based on game data acquired in the play target data acquisition step.

Further, a game distribution method of the present invention is a game distribution method for distributing a program, collectively or divided into parts, for having a computer such as a home-use game machine, a business use game machine, a portable game machine, a portable telephone or a personal computer to function as secondary play candidate data storage means for storing secondary play candidate data containing one or a plurality of game data used in playing a game and a name for the game data, primary play candidate data name selection means for selecting one or a plurality of game data names from secondary play candidate data stored in the secondary play candidate data storage means as one or a plurality of primary play candidate names, primary play candidate data storage means for storing primary play candidate data including primary play candidate data name information for displaying said one or a plurality of primary play candidate data names selected by the primary play candidate data name selection means, primary play candidate data name display means for displaying said one or a plurality of primary play candidate data names selected by the primary play candidate data name selection means based on primary play candidate data name information, play target data name selection means for selecting one or a plurality of game data names from primary play candidate data names displayed by the primary play candidate data name display means as one or a plurality of play target data names, play target data acquisition means for acquiring game data relating to said one or a plurality of play target data names selected by the play target data name selection means as play target data, and game control means for controlling a game based on game data acquired by the play target data acquisition means.

Further, a game distribution device of the present invention is a game distribution device for distributing a program, collectively or divided into parts, for having a computer such as a home-use game machine, a business use game machine, a portable game machine, a portable telephone or a personal computer to function as secondary play candidate data storage means for storing secondary play candidate data containing one or a plurality of game data used in playing a game and a name for the game data, primary play candidate data name selection means for selecting one or a plurality of game data names from secondary play candidate data stored in the secondary play candidate data storage means as one or a plurality of primary play candidate names, primary play candidate data storage means for storing primary play candidate data including primary play candidate data name information for displaying said one or a plurality of primary play candidate data names selected by the primary play candidate data name selection means, primary play candidate data name display means for displaying said one or a plurality of primary play candidate data names selected by the primary play candidate data name selection means based on primary play candidate data name information, play target data name selection means for selecting one or a plurality of game data name from primary play candidate data names displayed by the primary play candidate data name display means as one or a plurality of play target data names, play target data acquisition means for acquiring game data relating to said one or a plurality of play target data names selected by the play target data name selection means as play target data, and game control means for controlling a game based on game data acquired by the play target data acquisition means.

The present invention selects one or a plurality of primary play candidate data names from secondary play candidate data containing one or a plurality of items of game data and names for this game data. Primary play candidate data configured so as to contain primary play candidate data name information necessary for displaying a selected primary play candidate name is stored in a storage media. A primary play candidate data name is displayed based on the stored primary play candidate data name information. One or a plurality of the displayed primary play candidate data names is selected as a play target data name. A game can then be controlled based on game data for the selected play target data name.

Primary play candidate data is, for example, data for which the play frequency is high, etc. Further, primary play candidate data name information is not limited to the game data name itself, and may be, for example, an address indicating a storage position where a game data name is stored, etc. Moreover, the non-volatile storage device maybe, for example, and EEPROM (Electrically Erasable and Programmable Read Only Memory) or a hard disc storage device, etc. Further, collective distribution is distribution, for example, where the whole of a program is distributed all together. Further, distribution in parts is, for example, distributing parts of the program as required according to a phase of a game.

According to the present invention, when selecting game data as a play target, it is possible for the player to easily select game data for the play target because primary play candidate data names selected by the player are displayed.

Moreover, in an aspect of the present invention, primary play candidate data stored in the primary play candidate data storage means contains a game data name taken as the primary play candidate data name information and contains game data itself relating to at least part of the game data name. In doing this, it is possible to reduce the number of accesses to a storage media required in order to acquire primary play candidate data names, and time required in order to display the primary play candidate data names can be made shorter.

Stress felt by a player when selecting game data as a play target can therefore be alleviated.

Further, in an aspect of the present invention, there is provided secondary play candidate data deletion means for deleting game data corresponding to primary play candidate data stored in the primary play candidate data storage means and the game data name from the secondary play candidate data storage means. By doing this, it is possible to delete secondary play candidate data selected as primary play candidate data in a straightforward manner and convenience experienced by the player in deleting the secondary play candidate data is improved.

Moreover, in an aspect of the present invention, there is further provided primary play candidate data collective reading means for collectively reading primary play candidate data stored in the primary play candidate data storage means, wherein the primary play candidate data name display means displays the game data name included as primary play candidate data name information in primary play candidate data collectively read out by the primary play candidate data collective reading means as the primary play candidate data name based on the primary play candidate data name information, and the play target data acquisition means acquires game data from the primary play candidate data collectively read out by the primary play candidate data collective reading means.

Collective reading is reading of primary play candidate data (configured so as to contain a game data name taken as the primary play candidate data name information and game data itself relating to at least part of the game data name), enabling the primary play candidate data name display means to display a game data name contained in the primary play candidate data, and enabling the play target data acquisition means to acquire play target data from the primary play candidate data. For example, in a game device where the primary play candidate data name display means and the play target data acquisition means are implemented by program execution means such as a CPU (Central Processing Unit), arbitrary utilization is possible by the program execution means by reading out primary play candidate data for storing in storage means such as a main storage device.

In doing so, for example, at the time of starting the game, game data selected as play target data can be acquired by collectively reading out primary play candidate data from the storage media. It is therefore not necessary to access the storage media again and the time required for reading the game data can be made shorter. Namely, the time a player has to wait for when reading out game data can be made shorter and stress felt by a player can be further alleviated.

BRIEF DESCRIPTION OF THE DRAWINGS

FIG. 11 is a view showing an overall configuration for a game program distribution system using a communication network of the embodiment of the present invention.

BEST MODE FOR CARRYING OUT THE INVENTION

The following is a detailed description based on the drawings of a preferred embodiment of the present invention.

Figure 1:
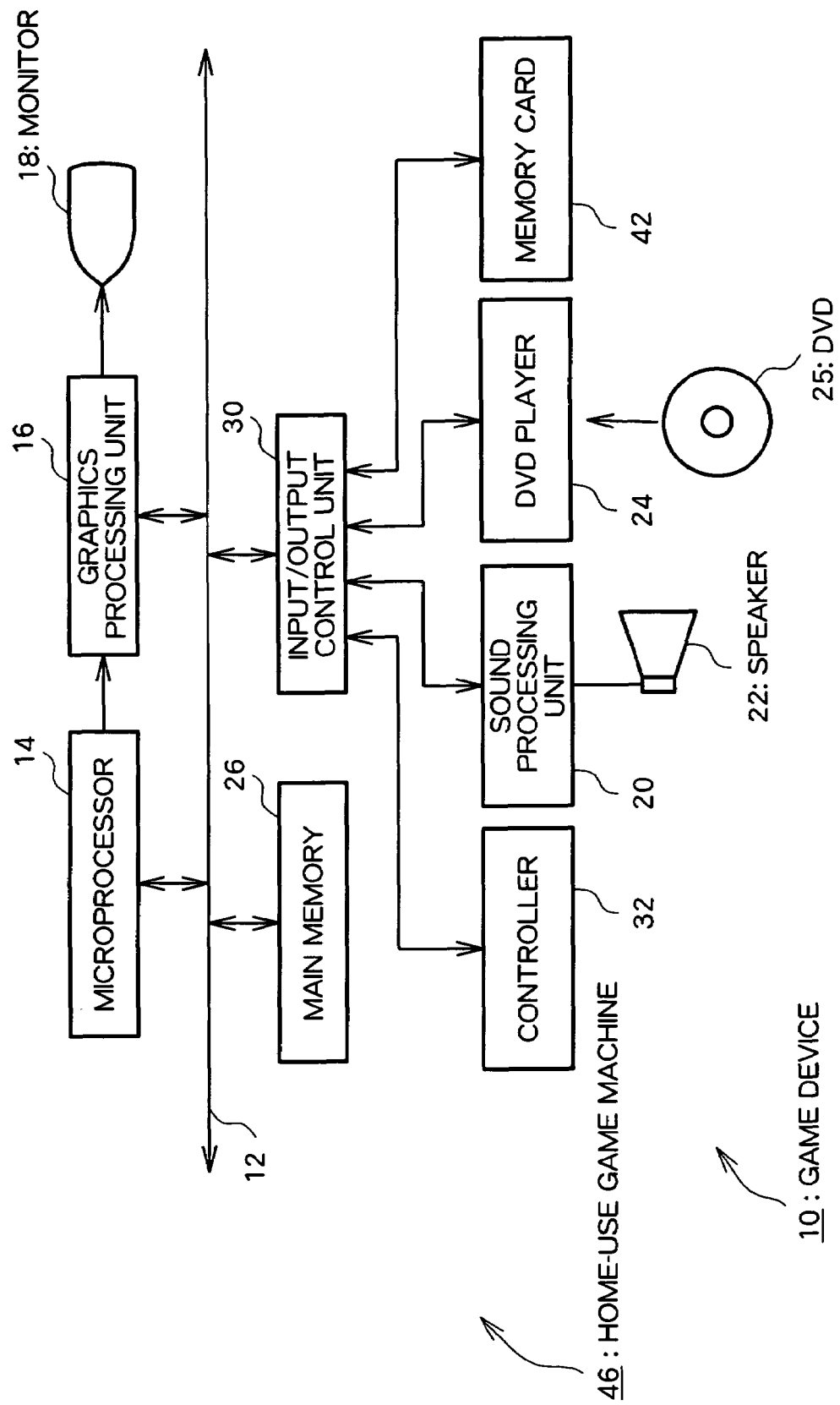
FIG. 1 is a view showing a hardware configuration for a game device of an embodiment of the present invention.

FIG. 1 is a view showing a hardware configuration for a game device 10 of each of the embodiment of the present invention. In FIG. 1, a game device 10 is configured by installing a DVD (Digital Versatile Disk; Trademark) 25 and a memory card 42 constituting information storage media in a home-use game machine 46 connected to a monitor 18 and a speaker 22. A household television is used as the monitor 18, and speakers incorporated into the television used as the speakers 22. Further, the DVD 25 is used to supply a game program and game data to the home-use game machine 46 but any other information storage media such as a CD-ROM (Compact Disc-Read Only Memory) or ROM (Read Only Memory) card etc. may also be used. Moreover, the game program or game data can also be supplied to the home-use game machine 46 from a remote location via a data communication network such as the Internet, etc.

The home-use game machine 46 is a computer game system including a microprocessor 14, graphics processing unit 16, main memory 26, input/output control unit 30, sound processing unit 20, controller 32, and DVD player 24. The microprocessor 14, graphics processing unit 16, main memory 26, and input/output control unit 30 are connected so as to be capable of mutual data communication using a bus 12, with the controller 32, sound processing unit 20, DVD player 24 and memory card 42 being connected to the input/output control unit 30. Each configuration element of the home-use game machine 46 is housed in a case.

The microprocessor 14 controls the respective elements of the home-use game machine 46 based on an operating system stored in a ROM (not shown), a game program read from the DVD 25, and saved data read from the memory card 42, so as to implement the providing of games to each player. The bus 12 is for exchanging addresses and data among the respective elements of the home-use game machine 46. The main memory 26, for example, has a configuration containing RAM (Random Access Memory), which is written with game programs read out from the DVD 25 and saved data read out from the memory card 42 as necessary. The graphics processing unit 16 has a configuration containing VRAM (Video Random Access Memory). The graphics processing unit 16 receives image data from the microprocessor 14, draws a game screen image on the VRAM based on the received data, and converts this content to a video signal, and output the signal to the monitor 18.

The input/output control unit 30 is an interface enabling the microprocessor 14 to access the controller 32, the sound processing unit 20, the DVD player 24, and the memory card 42. The sound processing unit 20 includes a sound buffer and reproduces music data, game sound effects and audio messages, and so on, which is reads out from the DVD 25 and stored in the sound buffer, and outputs sound via the speaker 22. The DVD player 24 reads game programs recorded on the DVD 25 in accordance with instructions from the microprocessor 14. The controller 32 is a general-purpose operation input means for enabling a player to carry out various operations and is equipped with an instruction button. Further, the memory card 42 is configured so as to include a non-volatile memory (for example, EEPROM etc.) that is detachable from the home-use game machine 46 and is for storing saved data etc. for various games.

With the game device 10 of this embodiment, secondary play candidate data storage means and primary play candidate data storage means are realized by a memory card 42. Further, the primary play candidate data name selection means, primary play candidate data name display means, play target data name selection means, play target data acquisition means, game control means and primary play candidate data collective reading means are implemented by hardware and software centered about the microprocessor 14.

Figure 2:
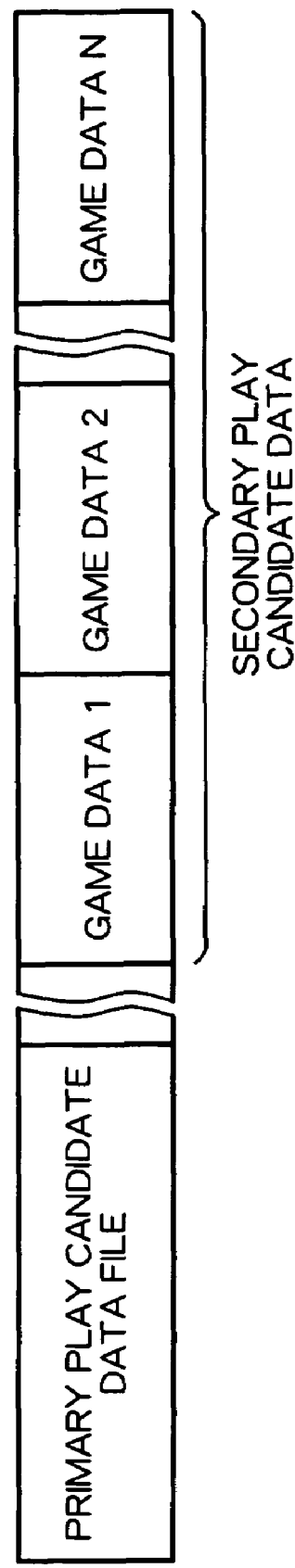
FIG. 2 is a view showing storage content of a memory card of an embodiment of the present invention.
Figure 3:
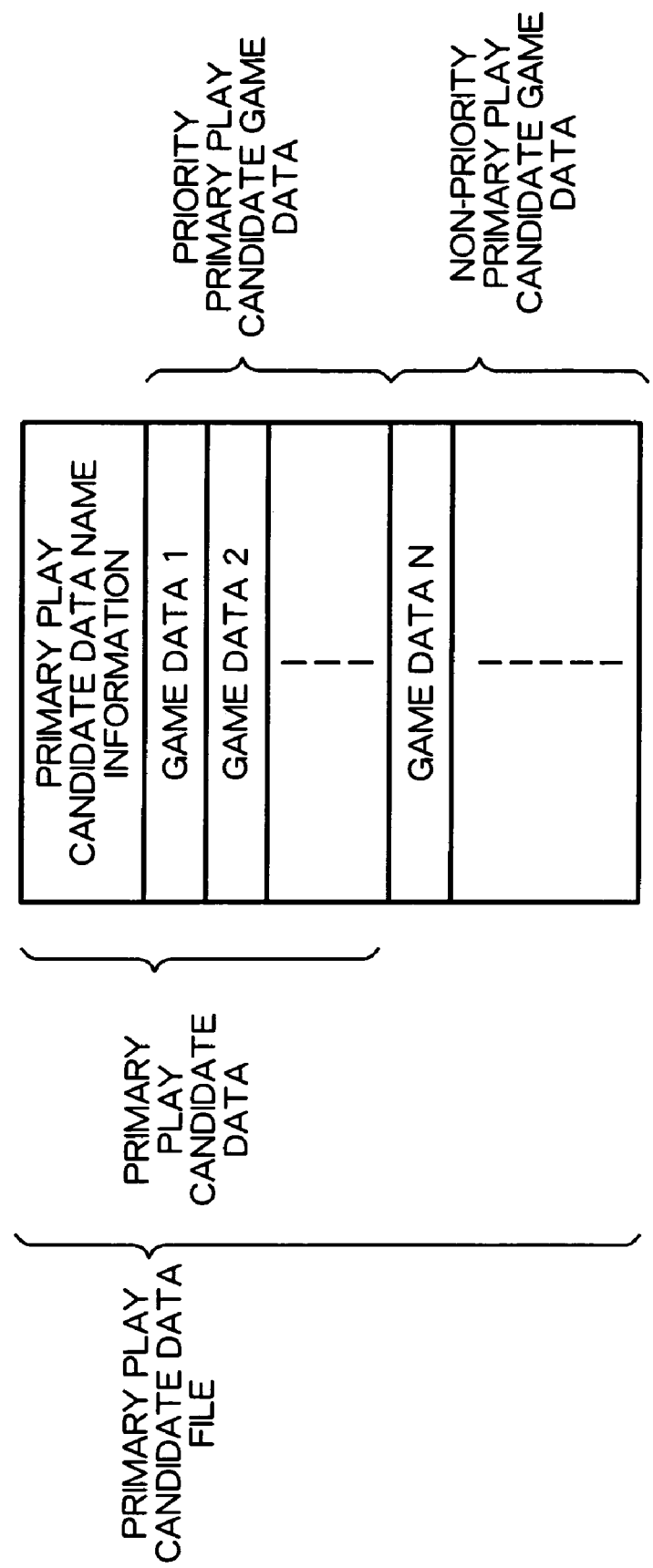
FIG. 3 is a view showing a data configuration for a primary play candidate data file of the embodiment of the present invention.

As shown in FIG. 2, at the game device 10 of this embodiment, a primary play candidate data file and one or a plurality of items of game data (secondary play candidate data) is stored at the memory card 42. The primary play candidate data file stored in the memory card 42 is not limited to one. A data configuration for the primary play candidate data file is shown in FIG. 3. As shown in FIG. 3, primary play candidate data and one or a plurality of non-priority primary play candidate game data is contained in the primary play candidate data file. Further, primary play candidate data name information and one or a plurality of priority primary play candidate game data is contained in the primary play candidate data. The primary play candidate data file is provided with a region containing primary play candidate data name information and a game data region containing priority primary play candidate game data and non-priority primary play candidate game data. The game data region is divided in order from the head, with each item of game data being included in each region.

Figure 4:
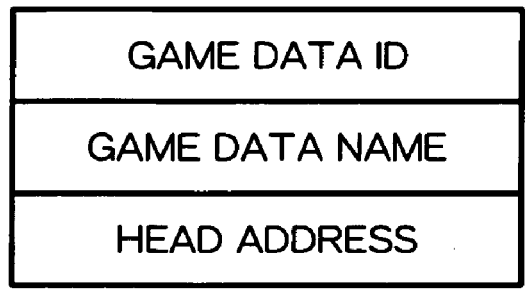
FIG. 4 is a view showing a data configuration for primary play candidate data name information of the embodiment of the present invention.

A data configuration for the primary play candidate data name information is shown in FIG. 4. As shown in FIG. 4, the primary play candidate data name information is comprised of 1) a game data ID for identifying the game data, 2) a game data name, 3) the head address of the region in which the game data is included, for all of the game data (priority primary play candidate game data and non-priority primary play candidate game data) contained in the primary play candidate data file.

Figure 7:
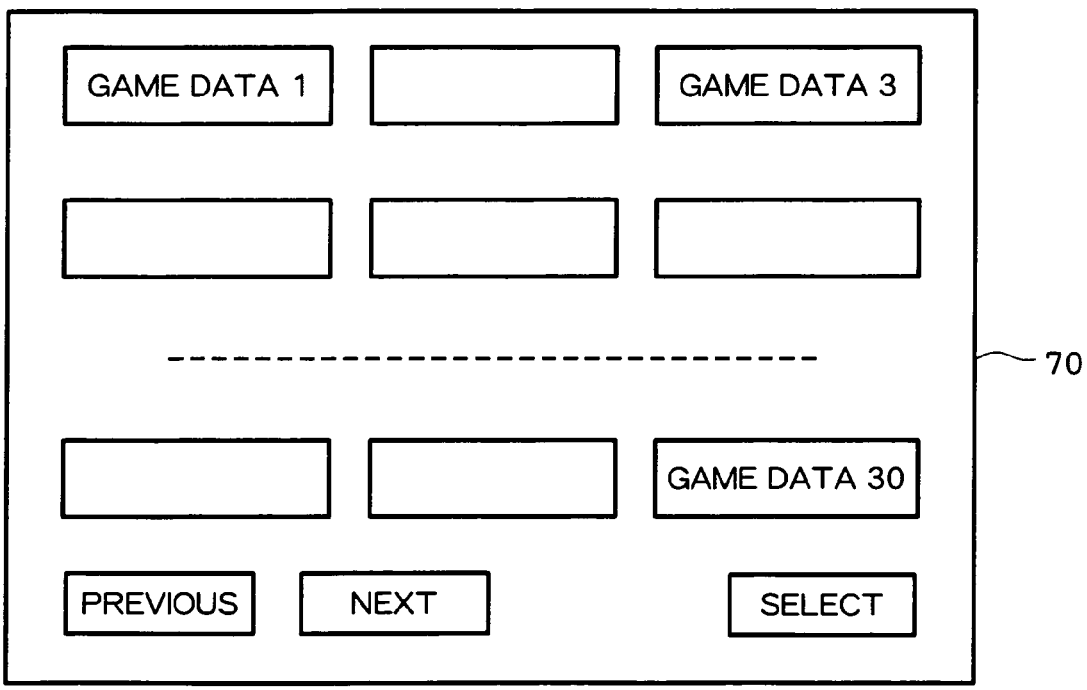
FIG. 7 is a view showing a play target data select screen of the embodiment of the present invention.

The priority primary play candidate game data is game data collectively read out together with primary play candidate data name information as primary play candidate data at the play target data selection screen (refer to FIG. 7). For example, in cases where a large volume of game data is contained in the primary play candidate data file, it is not possible to collectively read the primary play candidate data file and in this case dividing into priority primary play candidate game data and non-priority primary play candidate game data acquire a special meaning. It is also possible to provide non-priority primary play candidate game data. In this case, all of the game data contained in the primary play candidate data file is made priority primary play candidate game data. Namely, in this case, it is indicated that the primary play candidate data file and the primary play candidate data are the same.

In the following, a description is given of moving game data from the secondary play candidate data to the primary play candidate data file, and selecting play target data based on the primary play candidate data file.

Figure 5:
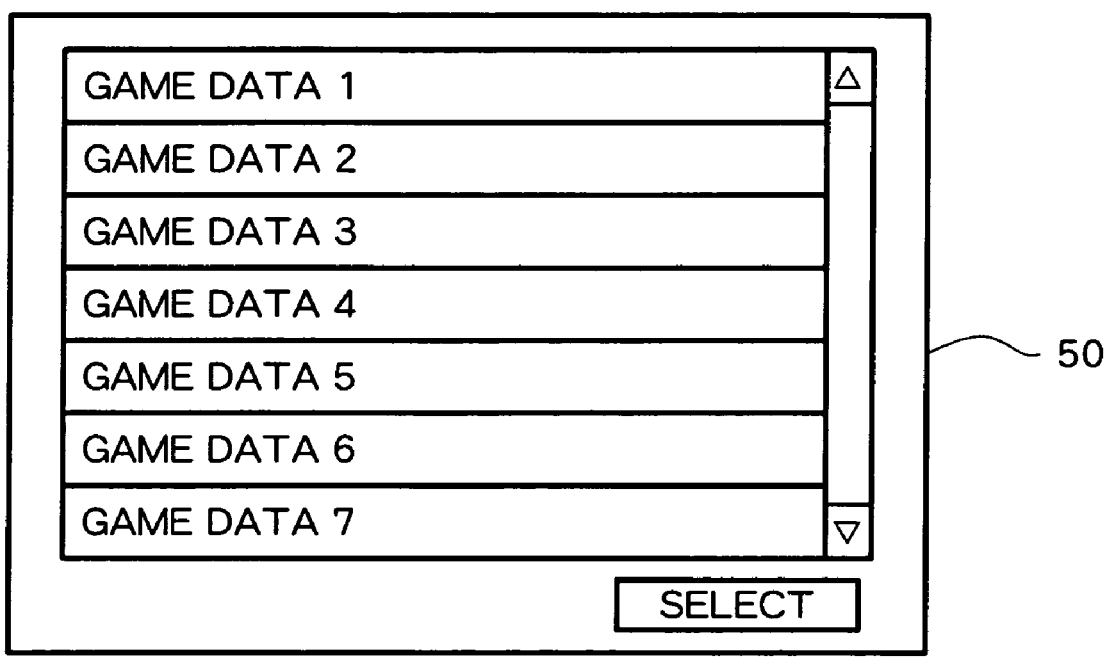
FIG. 5 is a view showing a data configuration for primary play candidate data selection screen of the embodiment of the present invention.
Figure 6:
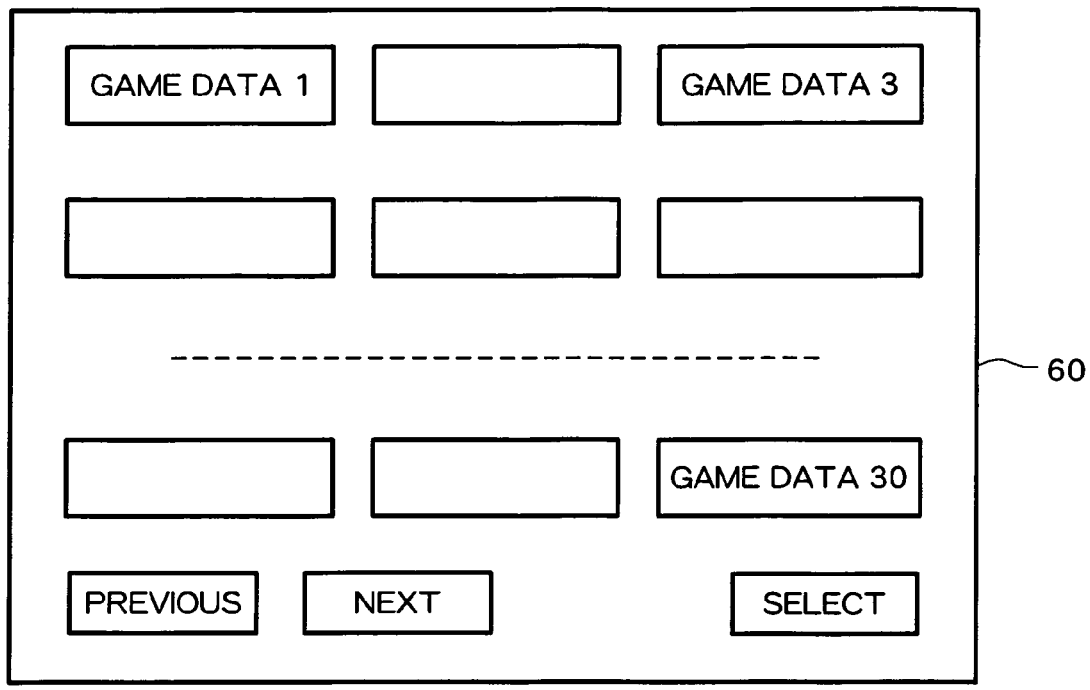
FIG. 6 is a view showing a game data movement destination designation screen of the embodiment of the present invention.

FIG. 5 shows a primary play candidate data selection screen and FIG. 6 shows a game data movement destination designation screen. A primary play candidate data selection screen 50 is a screen for selecting game data to move from the secondary play candidate data to the primary play candidate data file. The primary play candidate data selection screen 50 exists as part of primary play candidate data file management functions for, for example, changing game data names relating to game data contained in the primary play candidate data file and changing regions in which game data is contained. When game data is selected by a player at the primary play candidate data selection screen 50, a game data movement destination designation screen 60 is displayed. The game data movement destination designation screen 60 is a screen for designating which region of the game data regions of the primary play candidate data file game data selected at the primary play candidate data selection screen 50 is to be contained in. When a region is designated by a player at the game data movement destination designation screen 60, movement of game data from the secondary play candidate data to the primary play candidate data file is executed.

FIG. 7 shows a play target data selection screen. A play target data selection screen 70 is a screen for selecting game data (play target data) to be played by a player. The play target data selection screen 70 is displayed, for example, during game execution. At the play target data selection screen 70, when data to be played is selected by a player, a game is executed based on the selected data to be played.

In the following, a detailed description is given of moving game data from secondary play candidate data to the primary play candidate data file.

As shown in FIG. 5, a game data name relating to game data stored in the memory card 42 as secondary play candidate data is displayed at the primary play candidate data selection screen 50. A select button is displayed at the lower part of the screen. At the primary play candidate data selection screen 50, the player selects the name of game data to be moved to the primary play candidate data file from displayed game data names and designates the select button using the controller 32. When the select button is designated, processing is executed to move game data relating to the selected game data name to the primary play candidate data file.

Figure 8:
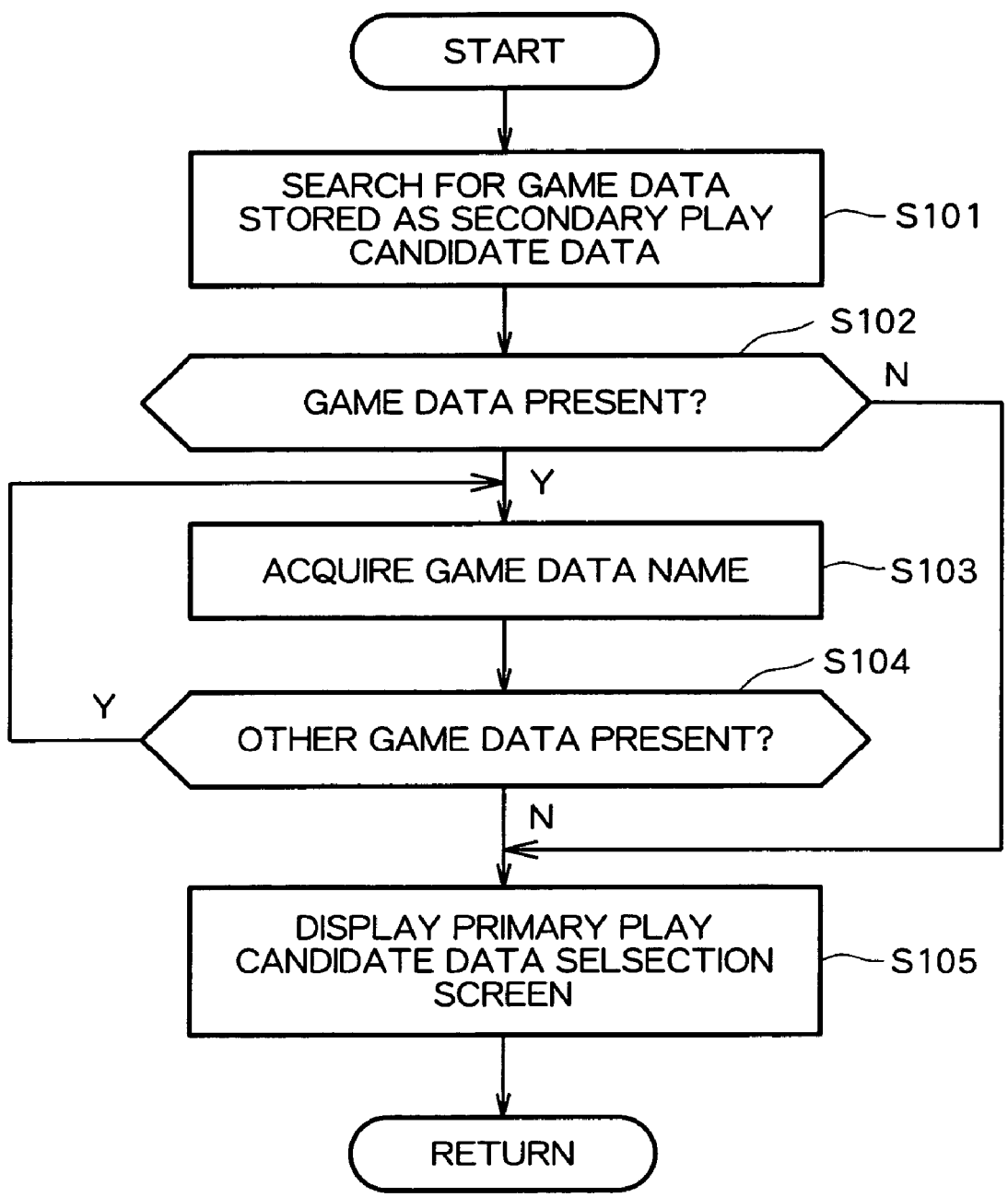
FIG. 8 is a flowchart showing a process for displaying a primary play candidate data selection screen of the embodiment of the present invention.

FIG. 8 is a flowchart for illustrating a process for displaying a primary play candidate data selection screen 50. In FIG. 8, in this processing, first, game data stored on the memory card 42 as secondary play candidate data is searched for (S101). When corresponding game data is found, game data names are acquired and stored (S102, S103). Further, all game data names relating to game data stored as secondary play candidate data are acquired, and the acquired game data names are stored (S104, S103). When game data names are stored for all of the game data stored in the memory card 42 as secondary play candidate data, the primary play candidate data selection screen 50 is displayed, and the stored game data names are displayed at the primary play candidate data selection screen 50 (S105). This processing is implemented through execution of a program stored in the DVD 25 etc. by a microprocessor 14.

Figure 9:
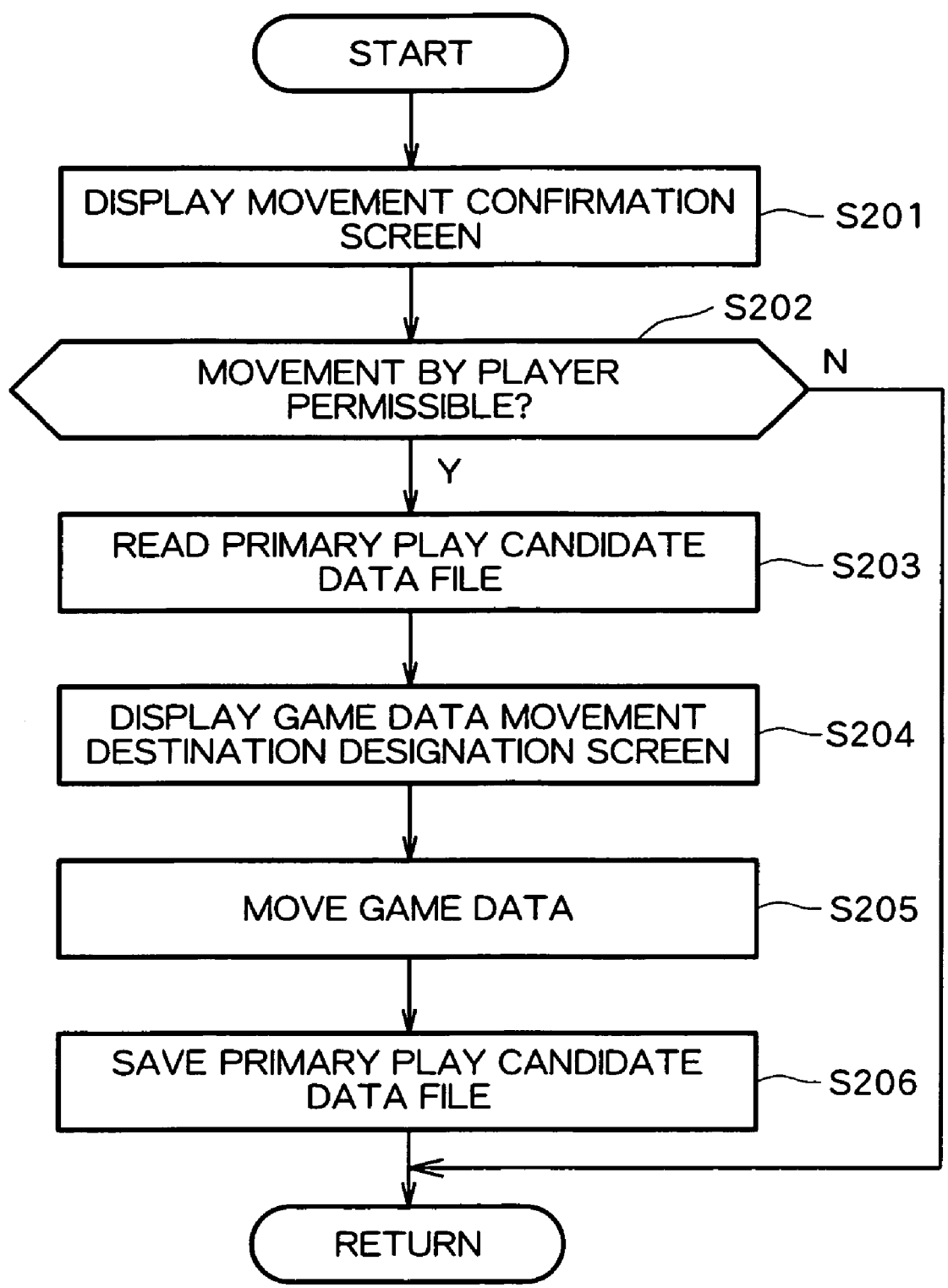
FIG. 9 is a flowchart showing a process for moving game data to a primary play candidate data file of the embodiment of the present invention.

FIG. 9 is a flowchart for illustrating a process for moving game data to a primary play candidate data file. In FIG. 9, in this processing, first, a movement confirmation screen for confirming movement with the player is displayed (S201). When the player does not permit the movement (S202), the game data movement process is halted. When movement is permitted by the player (S202), all of the primary play candidate data file is read out (S203). Namely, the primary play candidate data file stored in the memory card 42 is read out and stored in the main memory 26. The game data movement destination designation screen 60 is then displayed based on primary play candidate data name information contained in the primary play candidate data file stored in the main memory 26.

As shown in FIG. 6, conditions for the game data regions of the primary play candidate data file are displayed at the game data movement destination designation screen 60 based on the game data names contained in the primary play candidate data name information. Namely, game data names are displayed when game data is contained and an empty column is displayed when game data is not contained. Conditions for a prescribed few items from the head of the game data regions, for example, conditions for the game data regions for priority primary play candidate game data, are displayed when the game data movement destination designation screen 60 is displayed. In doing so, displaying of a large quantity of game data region conditions at the screen can be prevented. A select button, next button, and previous button are displayed at the lower part of the screen. Conditions that are not displayed at the screen, i.e. conditions that are a prescribed number down from the head of the game data region, can be displayed by designating the next button using the controller 32. Further, when the next button is designated and the previous button is then designated, the screen for before the next button was designated is displayed. At the game data movement destination designation screen 60, the player then selects an item where an empty column is displayed (an item where no game data name is displayed) as the movement destination for the game data and designates the select button using the controller 32.

At the game data movement destination designation screen 60, when the select button is designated, movement of the game data is executed (S205). Namely, game data selected by the player is read out, and is moved to a game data region designated for the primary play candidate data file stored in the main memory 26. The content of the primary play candidate data name information is then changed. The primary play candidate data file stored in the main memory 26 is then written and saved to the memory card 42 (S206). As a result, the process for moving game data to the primary play candidate data file is complete. This processing is implemented through execution of a program stored in the DVD 25 etc. by a microprocessor 14.

The following is a detailed description of from selection of the play target data based on the primary play candidate data file to execution of the game.

As shown in FIG. 7, game data names contained in the primary play candidate data name information are displayed at the play target data selection screen 70. When the play target data selection screen 70 is displayed, game data contained for a prescribed few items from the head of the game data region, for example, game data names relating to priority primary play candidate game data, is displayed. A select button, next button, and previous button are displayed at the lower part of the screen. Game data names relating to game data contained a prescribed number down from the head of the game data region are displayed by designating the next button using the controller 32. Further, when the next button is designated and the previous button is then designated, the screen for before when the next button was designated is displayed. At the play target data selection screen 70, the player selects play target game data from the displayed game data and designates the select button using the controller 32.

Figure 10:
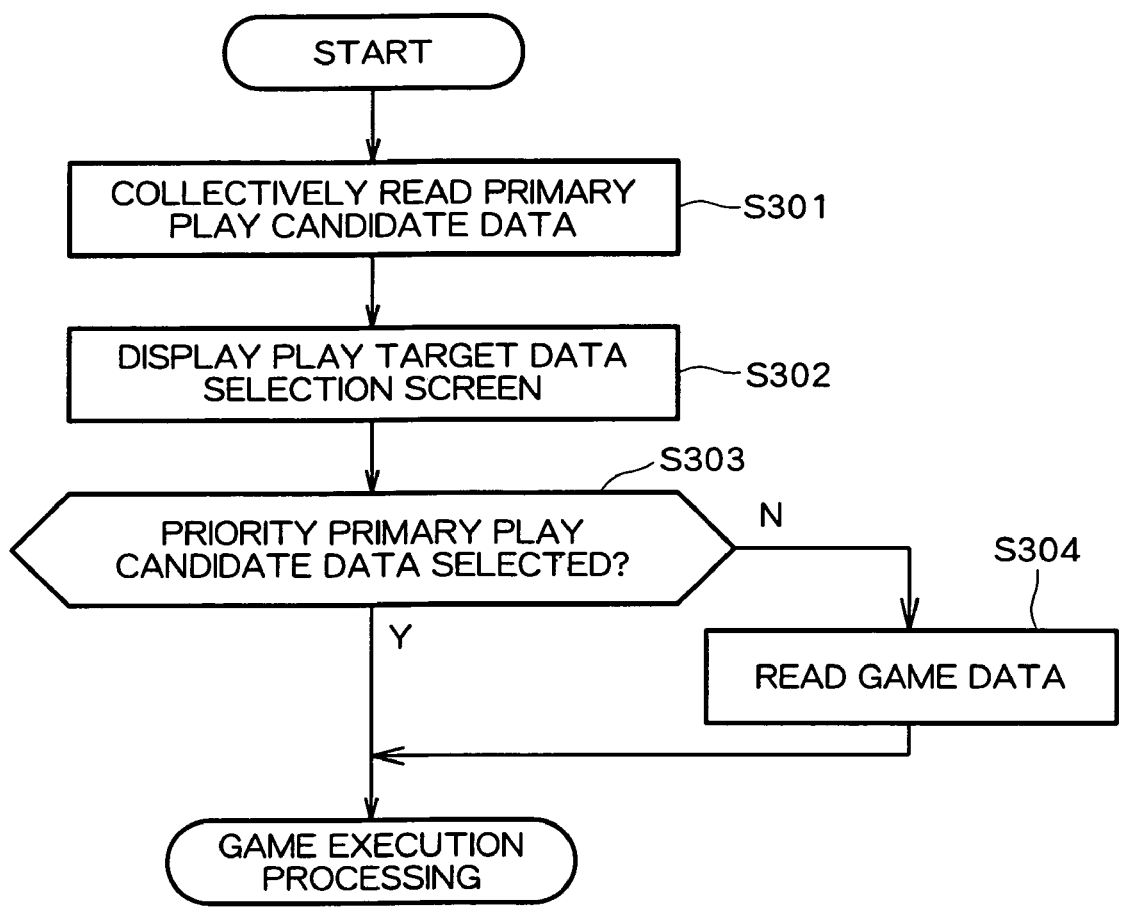
FIG. 10 is a flowchart showing a process from selection of play target data to game execution of the embodiment of the present invention.

FIG. 10 is a flow chart for illustrating a process from selection of play target data to game execution. As shown in FIG. 10, in this processing, first, primary play candidate data (primary play candidate data name information and priority primary play candidate game data) is collectively read out from the memory card 42 (S301). Namely, primary play candidate data is read from the memory card 42 and stored in the main memory 26. Next, the play target data selection screen 70 is displayed (S302). As described above, game data names contained in the primary play candidate data name information are displayed at the play target data selection screen 70. When play target data is selected at the play target data selection screen 70, a determination is made as to whether or not the selected play target data is priority primary play candidate game data (S303). When priority primary play candidate game data has been selected, the game data is already stored in the main memory 26, and the game is executed based on the game data stored in the main memory 26. When non-priority primary play candidate game data has been selected, the game data is not stored in the main memory 26. Game data is therefore read out from the memory card 42 (S304) and the game is executed. This processing is implemented through execution of a program stored in the DVD 25 etc. by a microprocessor 14.

According to the game device 10 described above, only game data names contained in the primary play candidate data file are displayed when a player is selecting data to be played, and a player can therefore easily select data to be played. Further, primary play candidate data is collectively read out in advance when selecting data to be played. Therefore the time required from selecting the data to be played to executing a game can be made shorter.

The present invention is not limited to the embodiment described above.

For example, in the above description, an example is given of implementing the present invention using a home-use game machine but the present invention may also be similarly applied to a business use game machine. It is preferable in this case for the monitor and speakers to be formed integrally.

Further, for example, in step S206 of FIG. 9, processing can be added to delete game data saved as primary play candidate data from secondary play candidate data. In this case, the secondary play candidate data deletion means can be implemented using hardware and software centered on the microprocessor 14. By doing this, it is possible to delete from secondary play candidate data for game data selected as primary play candidate data in a straightforward manner and convenience experienced by the player in deleting the secondary play candidate data of game data is improved.

Further, for example, in S301 of FIG. 10, collective reading out of primary play candidate data is executed but it is also possible to collectively read out the primary play candidate data when starting up the game. In doing so, it is not necessary to collectively read out primary play candidate data during processing for selecting data to be played, the time required to display the play target data selection screen can be made shorter, and stress experienced by a player can be alleviated.

Further, information comprising the primary play candidate data name information is not limited to that shown in FIG. 4. For example, display order information may also be added. In the above description, at the game data movement destination designation screen 60 and the play target data selection screen 70, displaying of game data names is carried out based on the order of the game data regions containing the game data, but may also be displayed based on display order information. Moreover, for example, comment information may also be added. In doing so, correspondence can be achieved with detailed information in the game data, and it is made still more straightforward for the player to select the game data.

Further, in the above, a description is given of moving game data from secondary play candidate data to a primary play candidate data file but, for example, when a player saves game data in a game, the game data may also be saved in a primary play candidate data file. Convenience for the player is therefore improved as a result.

Further, in the above description, a game program and game program data are supplied from an information storage media of a DVD 25 to a home-use game machine 46 but the game program and game data can also be distributed to each home via a communication network. FIG. 11 is a view showing an overall configuration for a game program distribution system using a communication network. As shown in FIG. 11, this game program distribution system 100 contains a game database 102, a server 104, a communication network 106, a personal computer 108, a home-use game machine 110, and a PDA (Personal Digital Assistant) 112. Of these, a game program distribution device 114 is configured from the game database 102 and the server 104. The communication network 106 is, for example, an internet or a cable television network. In this system, the game database 102 is stored with a game program and game data similar to the content stored in the DVD 25. A customer then makes a game distribution request using the personal computer 108, the home-use game machine 110, or the PDA 112 etc., and this is transmitted to the server 104 via the communication network 106. The server 104 reads the game program and game data from the game database 102 in response to the game distribution request and transfer them to the requesting entity, such as the personal computer 108, the home-use game machine 110, or the PDA 112 etc. Here, game distribution takes place in response to a game distribution request but transmission may also be one-way from the server 104. Further, it is not necessary for all of the game program and game data required for the implementation of the game to be distributed through a one-time download (download distribution), and it is also possible to distribute necessary portions according to the phase of the game (streaming distribution) If game distribution via this kind of communication network 60 is adopted, then it is straightforward for the customer to acquire the game program and game data.

INDUSTRIAL APPLICABILITY

As described above, by applying the present invention to a game etc., it is possible for a player to easily select game data to be played when playing a game.

The invention claimed is:

1. A game device comprising:
secondary data storage means for storing secondary data containing one or more game data used in playing a game and a name for the game data;
primary data name selection means for user selection of one or more game data names from the secondary data as one or more primary game data names;
primary data storage means for storing at least one primary data file including primary data name information for displaying said one or more selected primary game data names and user-designated priority and non-priority primary game data corresponding to said primary game data names;
means for storing one or more game data corresponding to said one or more primary game data names, as primary game data, in a priority region or a non-priority region of the at least one primary data file based on user selection, and storing said one or more primary game data names in a primary data name information region of the at least one primary data file;
primary data collective reading means for collectively reading out the priority region and the primary data name information region of the primary data file, and storing the priority region and the primary data name information region of the primary data file in main memory;
primary data name display means for displaying said one or more primary game data names stored in the primary data name information region of the primary data file stored in the main memory;
target data name selection means for selecting one or more game data names from the displayed primary game data names as one or more target data names;
target data acquisition means for acquiring game data relating to said one or more selected target data names as target data from the priority region of the primary data file stored in the main memory if game data relating to said one or more selected target data names is stored in the priority region of the primary data file, and acquiring game data relating to said one or more selected target data names as target data from the non-priority region of the primary data file stored in the primary data storage means if game data relating to said one or more selected target data names is stored in the non-priority region of the primary data file; and
game control means for controlling a game based on game data acquired by the target data acquisition means.

2. The game device of claim 1, further comprising secondary data deletion means for deleting game data corresponding to primary game data stored in the primary data storage means and the game data name from the secondary data storage means.

3. A computer readable information storage media storing a program, said program containing instructions for causing a computer to function as:
secondary data storage means for storing secondary data containing one or more game data used in playing a game and a name for the game data;
primary data name selection means for user selection of one or more game data names from the secondary data as one or more primary game data names;
primary data storage means for storing at least one primary data file including primary data name information for displaying said one or more selected primary game data names and user-designated priority and non-priority primary game data corresponding to said primary game data names;
means for storing one or more game data corresponding to said one or more primary game data names, as primary game data, in a priority region or a non-priority region of the at least one primary data file based on user selection, and storing said one or more primary game data names in a primary data name information region of the at least one primary data file;
primary data collective reading means for collectively reading out the priority region and the primary data name information region of the primary data file, and storing the priority region and the primary data name information region of the primary data file in main memory;

primary data name display means for displaying said one or more primary game data names stored in the primary data name information region of the primary data file stored in the main memory;

target data name selection means for selecting one or more game data names from the displayed primary game data names as one or more target data names;

target data acquisition means for acquiring game data relating to said one or more selected target data names as target data from the priority region of the primary data file stored in the main memory if game data relating to said one or more selected target data names is stored in the priority region of the primary data file, and acquiring game data relating to said one or more selected target data names as target data from the non-priority region of the primary data file stored in the primary data storage means if game data relating to said one or more selected target data names is stored in the non-priority region of the primary data file; and game control means for controlling a game based on game data acquired by the target data acquisition means.

4. A control method for a game device comprising:

a secondary data storage step of storing secondary data containing one or more game data used in playing a game and a name for the game data in a non-volatile storage device;

a primary data name selection step of accepting user selection of one or more game data names from the secondary data as one or more primary game data names;

a primary data storage step of storing at least one primary data file including primary data name information for displaying said one or more selected primary game data names and user-designated priority and non-priority primary game data corresponding to said primary game data names in the non-volatile storage device;

a step of storing one or more game data corresponding to said one or more primary game data names, as primary game data, in a priority region or a non-priority region of the at least one primary data file based on user selection, and storing said one or more primary game data names in a primary data name information region of the at least one primary data file;

a primary data collective reading step for collectively reading out the priority region and the primary data name information region of the primary data file, and storing the priority region and the primary data name information region of the primary data file in main memory;

a primary data name display step for displaying said one or more selected primary game data names stored in the primary data name information region of the primary data file stored in the main memory;

a target data name selection step for accepting selection of one or more game data names from the displayed primary game data names as one or more target data names;

a target data acquisition step for acquiring game data relating to said one or more selected target data names as target data from the priority region of the primary data file stored in the main memory if game data relating to said one or more selected target data names is stored in the priority region of the primary data file, and acquiring game data relating to said one or more selected target data names as target data from the non-priority region of the primary data file stored in the non-volatile storage device if game data relating to said one or more selected target data names is stored in the non-priority region of the primary data file; and a game control step for controlling a game based on game data acquired in the target data acquisition step.

5. A game distribution method for distributing a program collectively or divided into parts comprising a program embodied in a computer readable medium, said program containing instructions for causing a computer to function as:

secondary data storage means for storing secondary data containing one or more game data used in playing a game and a name for the game data;

primary data name selection means for user selection of one or more game data names from the secondary data as one or more primary game data names;

primary data storage means for storing at least one primary data file including primary data name information for displaying said one or more selected primary game data names and user-designated priority and non-priority primary game data corresponding to said primary game data names;

means for storing one or more game data corresponding to said one or more primary game data names, as primary game data, in a priority region or a non-priority region of the at least one primary data file based on user selection, and storing said one or more primary game data names in a primary data name information region of the at least one primary data file;

primary data collective reading means for collectively reading out the priority region and the primary data name information region of the primary data file, and storing the priority region and the primary data name information region of the primary data file in main memory;

primary data name display means for displaying said one or more primary game data names stored in the primary data name information region of the primary data file stored in the main memory;

target data name selection means for selecting one or more game data names from the displayed primary game data names as one or more target data names;

target data acquisition means for acquiring game data relating to said one or more selected target data names as target data from the priority region of the primary data file stored in the main memory if game data relating to said one or more selected target data names is stored in the priority region of the primary data file, and acquiring game data relating to said one or more selected target data names as target data from the non-priority region of the primary data file stored in the primary data storage means if game data relating to said one or more selected target data names is stored in the non-priority region of the primary data file; and game control means for controlling a game based on game data acquired by the target data acquisition means.

6. A game distribution device for distributing a program collectively or divided into parts, said program having a computer to function as:

secondary data storage means for storing secondary data containing one or more game data used in playing a game and a name for the game data;

primary data name selection means for user selection of one or more game data names from the secondary data as one or more primary game data names;

primary data storage means for storing at least one primary data file including primary data name information for displaying said one or more selected primary game data names and user-designated priority and non-priority primary game data corresponding to said primary game data names;
means for storing one or more game data corresponding to said one or more primary game data names, as primary game data, in a priority region or a non-priority region of the at least one primary data file based on user selection, and storing said one or more primary game data names in a primary data name information region of the at least one primary data file;
primary data collective reading means for collectively reading out the priority region and the primary data name information region of the primary data file, and storing the priority region and the primary data name information region of the primary data file in main memory;
primary data name display means for displaying said one or more primary game data names stored in the primary data name information region of the primary data file stored in the main memory;
target data name selection means for selecting one or more game data names from the displayed primary game data names as one or more target data names;
target data acquisition means for acquiring game data relating to said one or more selected target data names as target data from the priority region of the primary data file stored in the main memory if game data relating to said one or more selected target data names is stored in the priority region of the primary data file, and acquiring game data relating to said one or more selected target data names as target data from the non-priority region of the primary data file stored in the primary data storage means if game data relating to said one or more selected target data names is stored in the non-priority region of the primary data file; and
game control means for controlling a game based on game data acquired by the target data acquisition means.

7. A game device comprising:
a non-volatile storage device for storing at least one primary data file and secondary data;
a microprocessor for selecting, based on user input, one or more game data names from the secondary data stored in non-volatile storage device as one or more primary game-data names, storing one or more game data corresponding to said one or more primary game data names, as primary game data, in a priority region or a non-priority region of the at least one primary data file based on user selection, storing said one or more primary game data names in a primary data name information region of the at least one primary data file, selecting one or more game data names from primary game data names as one or more target data names, collectively reading out the priority region and the primary data name information region of the primary data file, storing the priority region and the primary data name information region of the primary data file in main memory, acquiring game data relating to said one or more selected target data names as target data from the priority region of the primary data file stored in the main memory if game data relating to said one or more selected target data names is stored in the priority region of the primary data file, and acquiring game data related to said one or more selected target data names as target data from the non-priority region of the primary data file stored in the non-volatile storage device if game data relating to said one or more selected target data names is stored in the non-priority region of the primary data file;
a video display for displaying said one or more selected primary game data names stored in the primary data name information region of the primary data file stored in the main memory; and
a game controller for controlling a game based on the acquired target data.

8. The game device according to claim 7, wherein the at least one primary data file comprises primary data name information for displaying said one or more primary game data names selected by the microprocessor and user-designated priority and non-priority primary game data corresponding to said primary game data names.

9. The game device according to claim 7, wherein the secondary data comprises one or more game data used in playing a game and a name for the game data.

10. A game system comprising:
a microprocessor which controls the game system based on game programs and user selected target data;
a media player which reads the game programs from readable media in accordance with instructions from the microprocessor;
main memory which stores the game programs read from the media player;
secondary memory which stores user-designated priority and non-priority primary game data comprising primary game data names and secondary data comprising secondary game data names; and
a game controller which provides a user interface for selecting a target data name from the prioritized primary game data names,
wherein the priority and non-priority primary game data is stored in the secondary memory in a priority region or a non-priority region, respectively, of at least one primary data file based on user prioritization,
wherein the priority region and the primary data name information region of the primary data file are read out and stored in the main memory, and
wherein target data related to the target data name is acquired from the priority region of the primary data file stored in the main memory if target data relating to the target data name is stored in the priority region of the primary data file, and target data related to the target data name is acquired from the non-priority region of the primary data file stored in the secondary memory if game data relating to the target data name is stored in the non-priority region of the primary data file, and the game program is controlled based on the acquired target data.

11. The game system according to claim 10 further comprising a graphics processing unit which draws a game screen image based on receive data from the microprocessor.

12. The game system according to claim 11 further comprising a video display unit which displays the game screen images created by the graphics processing unit.

* * * * *